(12) United States Patent
Liao et al.

(10) Patent No.: US 9,052,464 B1
(45) Date of Patent: Jun. 9, 2015

(54) TRANSFER OF LIGHT SIGNALS BETWEEN OPTICAL DEVICES

(71) Applicant: Kotura, Inc., Monterey Park, CA (US)

(72) Inventors: Shirong Liao, Mira Loma, CA (US); Mehdi Asghari, Pasadena, CA (US); Dazeng Feng, El Monte, CA (US); Roshanak Shafiiha, La Canada-Flintridge, CA (US); Daniel C. Lee, Montclair, CA (US); Wei Qian, Torrance, CA (US); Xuezhe Zheng, San Diego, CA (US); Ashok Krishnamoorthy, San Diego, CA (US); John E. Cunningham, San Diego, CA (US); Kannan Raj, San Diego, CA (US)

(73) Assignees: Kotura, Inc., Monterey Park, CA (US); Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/888,229

(22) Filed: May 6, 2013

Related U.S. Application Data

(60) Provisional application No. 61/849,110, filed on Jan. 18, 2013.

(51) Int. Cl.
*G02B 6/32* (2006.01)

(52) U.S. Cl.
CPC .................................... *G02B 6/32* (2013.01)

(58) Field of Classification Search
USPC .................. 385/14, 33, 31, 47, 147
See application file for complete search history.

(56) References Cited

U.S. PATENT DOCUMENTS

| | | | |
|---|---|---|---|
| 5,757,986 A | 5/1998 | Crampton et al. | |
| 5,908,305 A | 6/1999 | Crampton et al. | |
| 6,115,521 A * | 9/2000 | Tran et al. | 385/52 |
| 6,236,786 B1 | 5/2001 | Aoki et al. | |
| 6,385,374 B2 * | 5/2002 | Kropp | 385/47 |
| 6,694,068 B2 | 2/2004 | Parker | |
| 6,801,702 B2 | 10/2004 | Day | |
| 7,391,937 B2 | 6/2008 | Thorson et al. | |
| 7,869,671 B2 * | 1/2011 | Ishida et al. | 385/14 |
| 8,335,411 B2 * | 12/2012 | Kuznia et al. | 385/33 |
| 2003/0235371 A1 | 12/2003 | Shimada et al. | |
| 2004/0022496 A1 | 2/2004 | Lam | |
| 2004/0184717 A1 | 9/2004 | Koontz et al. | |
| 2004/0202414 A1 | 10/2004 | Wong et al. | |
| 2005/0041906 A1 * | 2/2005 | Sugama et al. | 385/14 |
| 2005/0244106 A1 | 11/2005 | Fukuyama et al. | |
| 2006/0018588 A1 | 1/2006 | Uchida | |
| 2006/0041906 A1 | 2/2006 | Sugama et al. | |
| 2006/0056756 A1 | 3/2006 | Uchida | |
| 2006/0126995 A1 | 6/2006 | Glebov et al. | |
| 2006/0215963 A1 | 9/2006 | Hamano | |
| 2007/0160322 A1 | 7/2007 | Ide et al. | |
| 2007/0183720 A1 | 8/2007 | Ide et al. | |
| 2007/0269165 A1 | 11/2007 | Hirose | |
| 2008/0226228 A1 * | 9/2008 | Tamura et al. | 385/33 |

* cited by examiner

*Primary Examiner* — Ellen Kim

(74) *Attorney, Agent, or Firm* — Gavrilovich, Dodd & Lindsey, LLP

(57) ABSTRACT

An optical device has a waveguide immobilized on a base. A lens is defined by the base. A reflecting side reflects a light signal that travels on an optical pathway that extends through the lens and into the waveguide. The reflecting side is positioned to reflect the light signal as the light signal travels along a portion of the optical pathway between the lens and the waveguide. An optical insulator that confines the light signal within the waveguide. The portion of the optical pathway between the lens and the waveguide extends through the optical insulator such that the light signal is transmitted through the optical insulator.

18 Claims, 4 Drawing Sheets

TRANSFER OF LIGHT SIGNALS BETWEEN OPTICAL DEVICES

RELATED APPLICATIONS

This Application claims the benefit of U.S. Provisional Patent Application Ser. No. 61/849,110, filed on Jan. 18, 2013, and incorporated herein in its entirety.

GOVERNMENT LICENSE RIGHTS

This invention was made with Government support under Agreement No. HR0011-08-9-0001 awarded by DARPA. The Government has certain rights in this invention.

FIELD

The present invention relates to optical devices and particularly, to systems that transfer the light signals from one optical device to another optical device.

BACKGROUND

It is often desirable for planar optical devices to exchange light signals with one another. A variety of systems stack the optical devices on top of one another. In these systems, the optical devices include ports that allow light signals to exit or enter the device through either the top of the device or the bottom of the device. In order for these ports to operate successfully, a variety of features are often added to the device. For instance, lenses and other optical component are often added to the device and/or placed between different devices in order correct for the direction, size, and/or shape of the light signal as it travels between the devices. Additionally, these ports often require the formation of reflecting surfaces at particular angles relative to other components in the device. For instance, these ports often require the formation of a reflecting surface angled at precisely 45° relative to the bottom of the device. These features add cost and complexity to the systems and are often a source of optical loss within the system. As a result, there is a need for optical devices that can be stacked with reduced levels of complexity.

SUMMARY

An optical device has a waveguide immobilized on a base. A lens is defined by the base. A reflecting side reflects a light signal that travels on an optical pathway that extends through the lens and into the waveguide. The reflecting side reflects the light signal as it travels along the portion of the optical pathway between the lens and the waveguide. An optical insulator confines the light signal within the waveguide; however, the portion of the optical pathway between the lens and the waveguide extends through the optical insulator such that the light signal is transmitted through the optical insulator.

BRIEF DESCRIPTION OF THE FIGURES

FIG. 1A is a topview of the device.

FIG. 1B is a cross-section of the device shown in FIG. 1A taken along the line labeled B.

FIG. 1C is a cross-section of the device shown in FIG. 1B taken along the line labeled C.

FIG. 2A is a topview of a device.

FIG. 2B is a cross-section of the device shown in FIG. 2A taken along the line labeled B.

FIG. 2C is a cross-section of the device shown in FIG. 2A taken along the line labeled B.

DESCRIPTION

The optical system stacks optical devices but uses optical devices that are greatly simplified. These devices are simplified by using the same layer of material to reflect a light signal at one location within the device and also to transmit that same light signal at a different location within the device. For instance, a device includes an optical insulator that defines a waveguide on a base. During operation of the device, the waveguide guides a light signal along a waveguide. As the light signal travels along the waveguide, the light signal is incident on the insulator but the insulator reflects the light signal back into the waveguide. Accordingly, the insulator constrains the light signal within the waveguide and accordingly defines a portion of the waveguide. The device includes a mirror that receives that same light signal from the waveguide. The mirror reflects the light signal back onto the insulator at an angle that causes the light signal to be transmitted through the insulator. The thickness of the insulator can be adjusted to permit efficient transmission of the light signal through the insulator. As a result, the same insulator operates both to reflect the light signal and to transmit the light signal. In prior devices, the insulator was removed in order to provide an optical pathway through the device. Since it is no longer necessary to remove the insulator, the device is greatly simplified.

Additionally, a lens is formed in the base. For instance, the base can include the insulator positioned on a substrate and a surface of the substrate can define the lens. The light signal can travel through the lens upon exiting from the device. As a result, the lens can adjust the optical characteristics of the light signal as the light signal travels between optical devices.

The device is greater simplified because the lens and mirror can be formed in the original wafer and accordingly do not require the addition of other optical components. For instance, the wafer can be a silicon-on-insulator wafer. When silicon is etched using a wet etch, the sides of the resulting recess are naturally at about 54.7°. This side can serve as the mirror. Further, the lens can be etched into the bottom of the device using a gray-scale mask. Accordingly, the features of the port are merely etched out of the original wafer. The ability to make the features of the port with simple etches and without introducing other components further simplifies the devices.

Figure 1A:
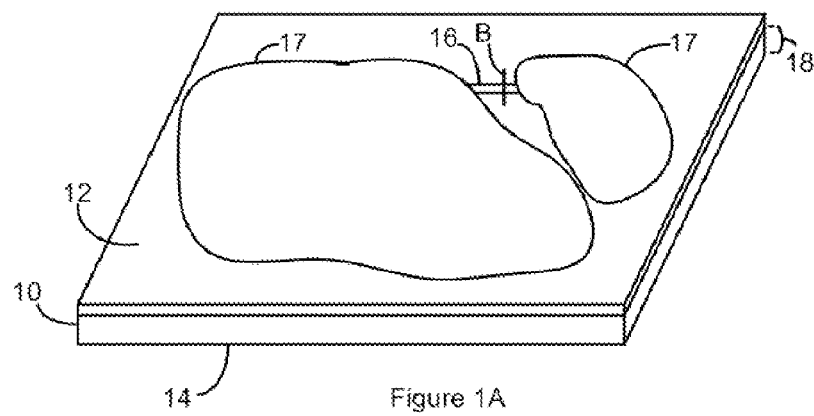
FIG. 1A through FIG. 1C illustrate an optical device within the class of optical devices called planar optical devices.
Figure 1B:
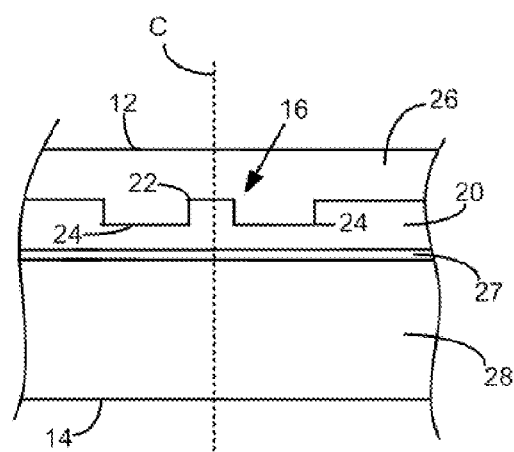
Figure 1C:
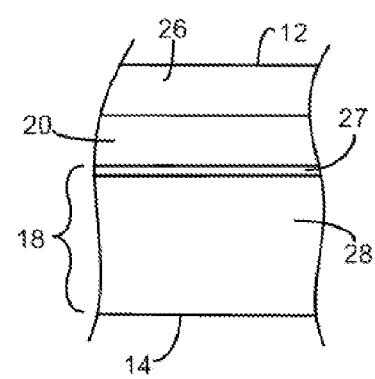

FIG. 1A through FIG. 1C illustrate an optical device. FIG. 1A is a topview of the device. FIG. 1B is a cross-section of the device shown in FIG. 1A taken along the line labeled B. FIG.

1C is a cross-section of the device shown in FIG. 1B taken along the line labeled C. The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extend through the lateral sides 10 of the device. The top side 12 and the bottom side 14 of the device are non-lateral sides.

The device includes one or more waveguides 16 that carry light signals between optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, light sensors that convert a light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

The waveguide 16 is defined in a first light-transmitting medium 20 positioned on a base 18. The first light-transmitting medium 20 includes a ridge 22 defined by trenches 24 extending partially into the first light-transmitting medium 20 or through the first light-transmitting medium 20. Suitable first light-transmitting media include, but are not limited to, silicon, polymers, silica, SiN, GaAs, InP and LiNbO$_3$. A fourth light-transmitting medium 26 is optionally positioned on the first light-light transmitting medium. The fourth light-transmitting medium 26 can serve as a cladding for the waveguide and/or for the device. When the first light-transmitting medium 20 is silicon, suitable fourth light-transmitting media include, but are not limited to, silicon, polymers, silica, SiN, GaAs, InP and LiNbO$_3$.

The portion of the base 18 adjacent to the first light-transmitting medium 20 is configured to reflect light signals from the waveguide 16 back into the waveguide 16 in order to constrain light signals in the waveguide. For instance, the portion of the base 18 adjacent to the first light-transmitting medium 20 can be an optical insulator 27 with a lower index of refraction than the first light-transmitting medium 20. The drop in the index of refraction can cause reflection of a light signal from the first light-transmitting medium 20 back into the first light-transmitting medium 20. The base 18 can include the optical insulator 27 positioned on a substrate 28. As will become evident below, the substrate 28 can be configured to transmit light signals. For instance, the substrate 28 can be constructed of a light-transmitting medium that is different from the first light-transmitting medium 20 or the same as the first light-transmitting medium 20. In one example, the device is constructed on a silicon-on-insulator wafer. A silicon-on-insulator wafer includes a silicon layer that serves as the first light-transmitting medium 20. The silicon-on-insulator wafer also includes a layer of silica positioned on a silicon substrate. The layer of silica can serving as the optical insulator 27 and the silicon substrate can serve as the substrate 28.

Figure 2A:
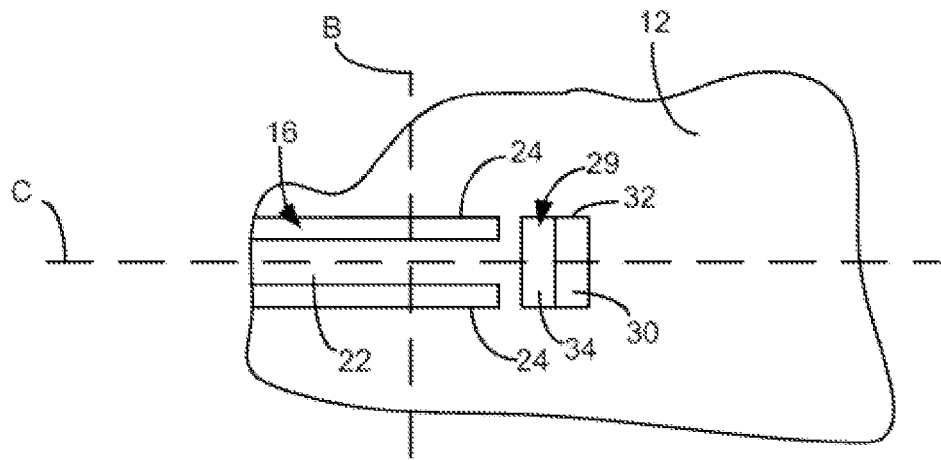
FIG. 2A through FIG. 2C illustrate a portion of an optical device that includes a port configured to receive a light signal from a waveguide or configured to direct light signals from outside of the device into the waveguide.
Figure 2B:
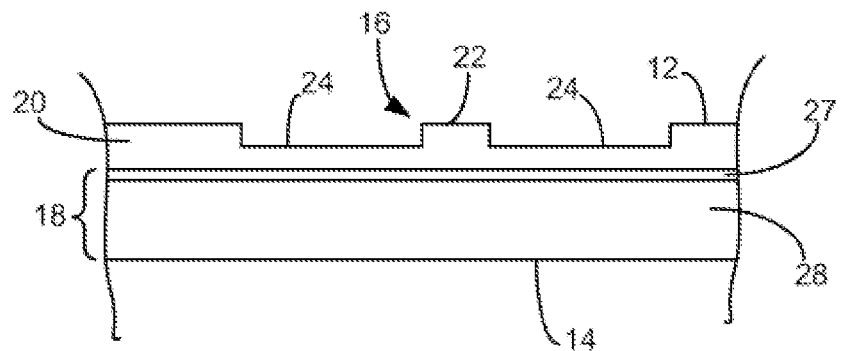
Figure 2C:
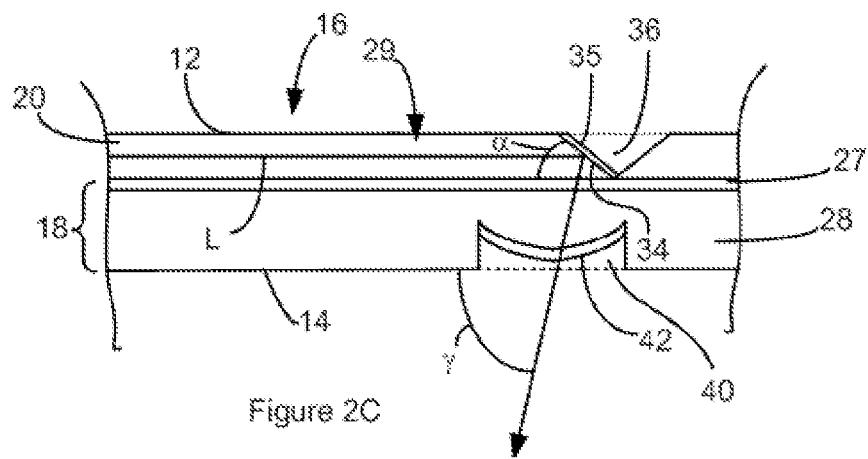

As noted above, an optical port is an example of an optical component that can be included on an optical device constructed according to FIG. 1A through FIG. 1C. FIG. 2A through FIG. 2C illustrate a portion of an optical device that includes a port configured to receive a light signal from a waveguide 16 or configured to direct light signals from outside of the device into the waveguide 16. FIG. 2A is a topview of the device. FIG. 2B is a cross-section of the device shown in FIG. 2A taken along the line labeled B. FIG. 2C is a cross-section of the device shown in FIG. 2A taken along the line labeled B.

The port includes a port recess 29 that extends into or through the first light-transmitting medium 20. The port recess 29 includes one or more sides. The illustrated port recess 29 includes a back side 30, lateral sides 32 and a reflecting side 34.

During operation of the device, the reflecting side 34 receives a light signal from the waveguide 16 and is configured to reflect the light signal as shown by the arrow labeled L in FIG. 2C. As a result, the reflecting side 34 optionally includes a reflecting medium 35 to enhance reflection of the light signal in the port recess 29. FIG. 2C shows the reflecting medium 35 on the reflecting side 34; however, the reflecting medium 35 can be positioned on one or more other sides of the port recess 29. Suitable reflecting media include, but are not limited to, reflective metals such as Al and Au.

A second medium 36 can optionally be positioned in the port recess 29. The second medium 36 can be a liquid or a gas and is preferably air. The second medium 36 can have a different index of refraction than the first light-transmitting medium 20. Suitable second light-transmitting media include, but are not limited to, air, epoxy, polymers, spin-on glasses and evaporated or sputtered films. An example of a suitable polymer is Polyimide PI2611 that is not a substantial source of stress for an optical device constructed on a silicon-on-insulator wafer. As illustrated by the dashed line in FIG. 2C, a suitable gas for use as the second medium 36 includes the atmosphere in which the device is positioned.

The reflecting medium 35 is optional because a drop in the index of refraction at the interface with the different material at the reflecting side 34 may provide the desired level of reflection and, in some instances, provide total internal reflection. For instance, when the light-transmitting medium 20 is silicon, there is no reflecting medium 35 on the reflecting side 34, and the light-transmitting medium 36 is air, the drop in index of refraction between the silicon and air may provide a desirable level of reflection and may provide total internal reflection.

During operation of the device, a light signal guided by the waveguide 16 travels to an end of the waveguide 16 and is traveling in the direction of propagation immediately before being reflected at the reflecting side 34. The reflecting side 34 is configured such that the reflected light signal travels through the base before exiting from the device. For instance, the reflecting side 34 is configured such that the reflected light signal travels through the optical insulator 27 and substrate 28 before exiting from the device.

As evident in FIG. 2C, the reflecting side 34 is positioned at an angle α measured relative to the base 18. The angle α is selected to provide an angle of incidence between the light signal and the optical insulator 27 that is sufficient for the light signal to be transmitted through the optical insulator 27. In the waveguide 16 and before being reflected, the angle of incidence between the light signal and the optical insulator 27 is such that the light signal is reflected back into the waveguide and total internal reflection can be achieved. As a result, the optical insulator confines the light signal within the waveguide and accordingly, defines a portion of the waveguide. In contrast, after being reflected, the angle of the reflecting side 34 increases the angle of incidence between the light signal and optical insulator enough that the light signal is transmitted through the optical insulator. Suitable angles for α include, but are not limited to, angles of at least 35°, 40°, or 45° and/or at most 50°, 55°, or 60°. When the first light-transmitting medium 20 is silicon and the port recess 29 is formed by wet etching, a suitable angle for α is about 54.7° since the crystalline structure of the silicon layer causes sides of the port recess 29 to be naturally etched at an angle of about 54.7°. In one example, the α is about 54.7°. A suitable angle of incidence for achieving transmission of the light signal through the optical insulator 27 includes, but is not limited to, angles of at least −20°, −10°, or 0° and/or at most 10°, 20°, or 30°. An angle α of about 54.7° produces an angle of incidence between light signal and optical insulator 27 of about 19.4°.

The efficiency of transmitting the light signal through the optical insulator 27 can also be increased by changing the thickness of the optical insulator 27. For instance, the degree of reflection can be reduced by increasing the thickness of the optical insulator 27. In some instances, the optical insulator can have a thickness of at least 0.3, 0.6, or 0.9 micron and/or less than 1.5, 2, or 1 micron. In one example, the device is constructed on a silicon-on-insulator wafer and the optical insulator has a thickness greater than 0.8 microns and less than 1 micron.

The substrate includes a lens 38 positioned such that the light signal traveling through the base is received by a lens 38 as shown in FIG. 2C. The light signal exits from the device through the lens 38. The lens 38 is defined by the base. In particular, the lens 38 is defined by the bottom of the substrate. As shown in FIG. 2C, the lens 38 can be a bump extending outward from a side of the substrate. The lens 38 can be surround by flat portions of the substrate. The lens can be convex or concave.

As is evident from FIG. 2C, the light signal can exit from the device traveling in a direction that is non-perpendicular relative to a plane of the device. For instance, the light signal can exit from the device at an angle γ relative to a plane of the device. In some instances, the reflecting side 34, lens 38, and device materials are constructed such that the angle γ is at least 14, 16, or 18, and/or is at most 20, 22, or 24.

The lens 38 acts as a facet through which a light signal exits the device. This facet can optionally be coated with an anti-reflective coating 42 to discourage reflection of light signals exiting the device. When the portion of the base 18 acting as a facet is constructed of silicon, a suitable anti-reflective coating 42 includes, but is not limited to, single-layer coatings such as silicon nitride or aluminum oxide, or multilayer coatings which may contain silicon nitride, aluminum oxide, and/or silica.

As shown in FIG. 2C, the lens 38 is positioned in a lens recess that extends into the bottom of the substrate. A third light-transmitting medium 40 can optionally be positioned in the lens recess. The third light-transmitting medium 40 can be a solid or a gas such as air. As is evident from the dashed line in FIG. 2C, a suitable gas for use as the third light-transmitting medium 40 includes the atmosphere in which the device is positioned.

Figure 2D:
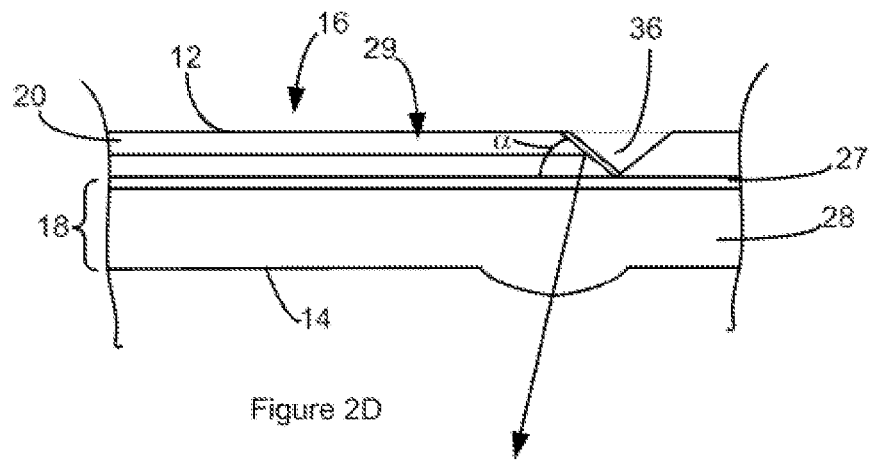
FIG. 2D is another embodiment of a cross-section of the device shown in FIG. 2A taken along the line labeled B.

The lens 38 need not be positioned in a lens recess. For instance, the lens 38 can extend outward from the flat bottom of the base as illustrated in FIG. 2D.

Figure 3:
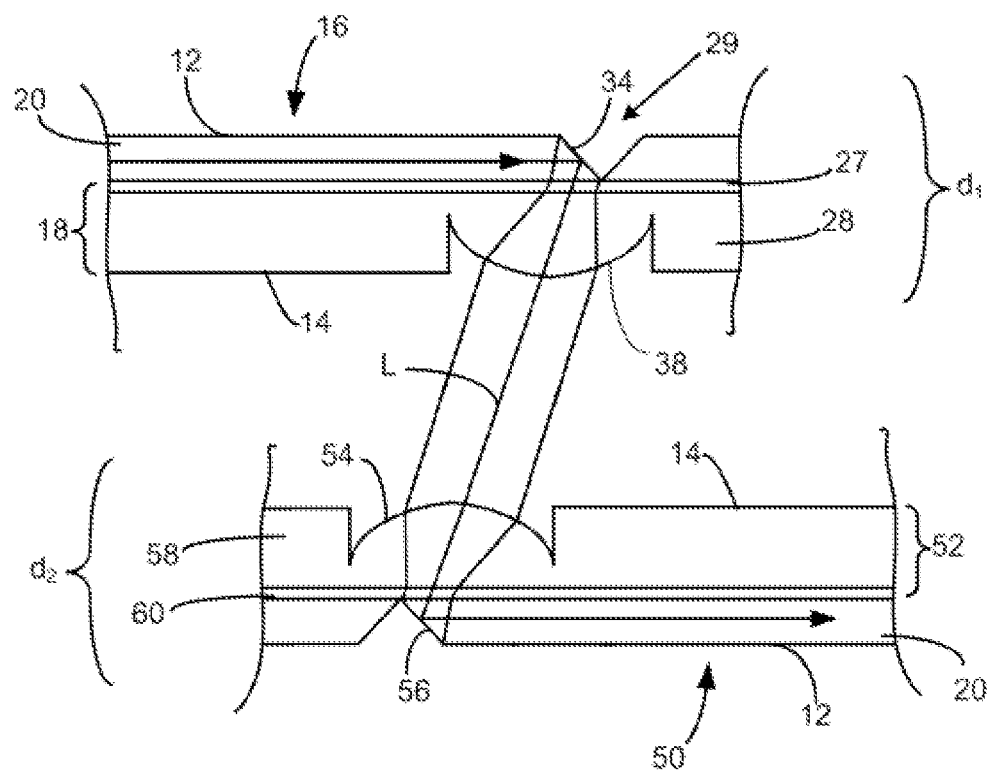
FIG. 3 is a cross-section of a system where multiple devices constructed according to FIG. 1A through FIG. 2D are interfaced with one another.

Although the operation of the device is described in the context of a light signal traveling from the waveguide 16 and then through the port, the device can be operated in reverse. For instance, the port can receive a light signal that travels through the base to the reflecting side 34 and is then received and guided by the waveguide 16. The ability to operate these devices in either direction allows the devices to be assembled into an optical system such that the different devices that can communicate with one another. For instance, FIG. 3 illustrates a system that includes a plurality of the devices that are stacked so as to exchange a light signal between the devices. The devices are spaced apart from one another. For instance, the devices can be separated by a gas such as air or such as the ambient atmosphere in which the devices are placed.

The device labeled d1 (device d1) includes a port constructed according to FIG. 1A through FIG. 2D. The device labeled d2 (device d2) includes a port constructed according to FIG. 1A through FIG. 2D. FIG. 3 shows only a portion of each device, as a result, the devices can include other optical components for processing of light signals such as the optical components discussed in the context of FIG. 1A through FIG. 1C. Additionally, each device can include additional ports that are not evident in FIG. 3. Some of the details that are evident in FIG. 1A through FIG. 2D are not evident in FIG. 3 in order to simplify the illustration. For instance, anti-reflective coatings 42, reflecting medium 35 and the second medium 36 shown in FIG. 2C are not evident in the devices of FIG. 3.

The device d2 includes a second waveguide 50 immobilized on a second base 52. A second lens 54 defined by the second base 52. A second reflecting side 56 that reflects a light signal that travels on an optical pathway that extends through the second lens 54 and into the second waveguide 50. The optical pathway extends into the second waveguide 50 such that the light signal is guided through the second waveguide 50. The second reflecting side 56 is positioned to reflect the light signal as the light signal travels along the portion of the optical pathway between the second lens 54 and the second waveguide 50. The second base 52 includes a second optical insulator 60 that is positioned on a second base 58 and confines the light signal within the second waveguide 50. The portion of the optical pathway between the second lens 54 and the second waveguide 50 extends through the second optical insulator 60 such that the light signal is transmitted through the second optical insulator.

For the purposes of the following discussion, the light signal is assumed to travel through the system in the direction of the arrow labeled L in FIG. 3. For instance, device d2 is positioned to receive the light signal from device d1. In particular, device d2 is positioned so the light signal from device d1 is incident on the second lens 54 of device d2 and device d2 routes the received light signal to the second waveguide 50.

FIG. 3 shows the effects of diffraction as the light signal travels through the optical device d1. As is evident from FIG. 3, the effects of diffraction can optionally be reduced by configuring the lens 38 such that the light signal is collimated or substantially collimated as the light signal travels between device d1 and device d2. However, as will be discussed in more detail below, the lens 38 need not collimate the light signal. For instance, the lens 38 can focus the light signal or spread the light signal.

Although the lens 38 and the second lens 54 can be the same, the amount of optical loss associated with the transfer of the light signal from device d1 to device d2 can be reduced by altering this arrangement. An example source of optical loss is mode distortion through lens and mirror clipping. It is difficult to reconstruct the same mode shape and size on the second reflecting side 56 as the optical mode on the waveguide 18. The difference in the size and shape of the two modes is a source of optical loss known as mode mis-match. This loss can be reduced to an acceptable level using a different second lens 54 than is used for the first lens 38. For instance, the loss can be reduced when the second lens 54 has a higher numerical aperture than the first lens 38. In one example, the numerical aperture of the second lens 54 is more than 1.2 times, 1.4 times, or 1.6 times the numerical aperture of the lens 38 and, additionally or alternatively, the numerical aperture of the first lens 38 is greater than 0.4, 0.5, and 0.6 and the numerical aperture of the second lens 54 is at least 0.7, 0.8 or 0.9. The numerical aperture of the lenses can be tuned by changing the lens aperture (D) and/or focal length of the lens in order to achieve the desired numerical aperture. In some instances, the focal length of the first lens 38 is less than 200, 100, 50 microns and/or at least 15, 20 or 40 microns, the focal length of the second lens 54 is less than 58, 30 or 15 microns and/or at least 12, 10, or 5 microns. The lens 38 and/or the second lens 54 can have these values for the focal length in addition to the ratios set forth above (i.e. 1.2, 1.4, or 1.6) or as an alternative to these ratios. The above values for the numerical aperture, lens aperture (D), and/or focal length are preferably applied to silicon lenses. The preferred values of numerical aperture, lens aperture (D), and/or focal length may be different for lenses constructed of different materials. As a result, in one example, the lenses are constructed of a material that includes or consists of silicon and have a numerical aperture, lens aperture (D) and/or focal length as described above.

Figure 4:
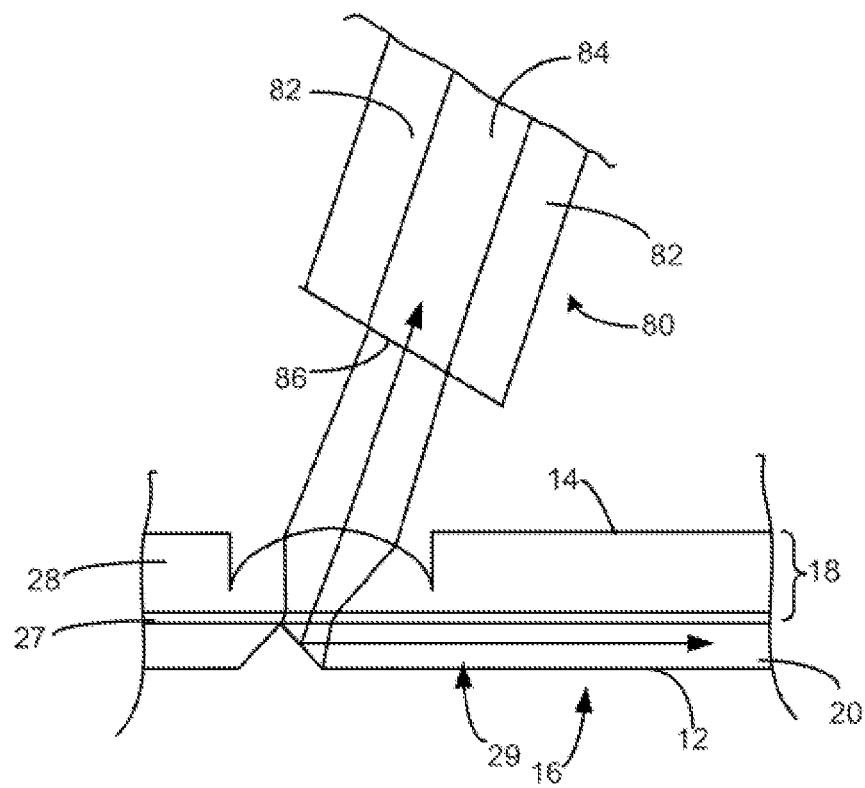
FIG. 4 is a cross-section of a system a multiple device constructed according to FIG. 1A through FIG. 2D is interfaced with an optical fiber.

The devices can also be incorporated into other systems. For instance, FIG. 4 is a cross section of a system that includes a device that exchanges a light signal with an optical fiber 80. The device includes a port constructed according to FIG. 2A through FIG. 2D. Light signals can travel from the fiber 80 into the device and/or light signals can travel from the device into the fiber 80.

The optical fiber 80 includes a cladding 82 on a core 84 that ends at a facet 86. The device can be configured such that the light signal is collimated or substantially collimated after exiting from the device. In these instances, the dimensions of the core 84 should match or exceed the dimensions of the collimated light signal spot size in order to reduce optical loss that can occur upon the light signal entering the facet 86. Alternately, the device can be configured such that the lens 38 reduces the spot size as the light signal travels between the device and the optical fiber 80. Alternately, the device can be configured such that the lens 38 expands the spot size as the light signal travels between the device and the optical fiber 80.

In one example of a system according to FIG. 4, the focal length of the lens 38 is at least 10, 20, or 30 microns and/or at most 40, 50, or 60 microns and/or the numerical aperture of the lens 38 is at least 0.4, 0.5, or 0.6 and/or at most 0.7, 0.8, or 0.9.

In the systems of FIG. 3 and FIG. 4, the devices are illustrated as being spaced apart from one another with the atmosphere in which the system is placed being located between the devices; however, the devices can be separated by a solid material such as an epoxy or other transparent layer of material. For instance, an epoxy can be employed for mounting the optical fiber 80 on the device in order to immobilize the optical fiber 80 relative to the device. In some instances, when the system includes a solid between adjacent planar optical devices, the system can be identified by the repeating materials that are associated with repeating component platforms. For instance, the system can be identified by the repeating materials of a silicon-on-insulator wafer since each of the silicon-on-insulator wafers includes a silica insulator between a silicon substrate and another silicon layer for guiding of waveguides. The repeating pattern of dimensions for the repeating materials can also be present in the system. For instance, the silica insulator, silicon substrate and silicon layer for guiding of waveguides will have about the same thickness on each of the devices.

Figure 5:
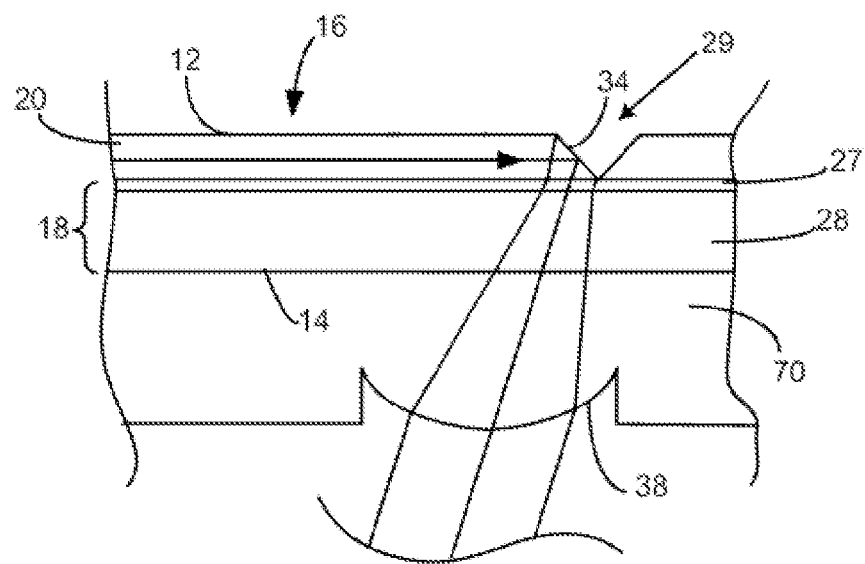
FIG. 5 illustrate a portion of an optical device that includes a port configured to receive a light signal from a waveguide or configured to direct light signals from outside of the device into the waveguide.

Increasing the distance between the reflecting side 34 and the lens 38 reduces the level of curvature needed on the lens. Reducing the lens curvature can make the lens easier to fabricate. This distance can be increased by using a thicker substrate 28. A suitable thickness for the substrate 28 includes, but is not limited to, a thickness greater than 800 μm, 1.4 mm, 2.0 mm, or 3.0 mm. Additionally or alternatively, a spacer 70 can be used to increased the distance as shown in FIG. 5. For instance, FIG. 5 is a cross section of a portion of an optical device that includes a port configured to receive a light signal from a waveguide or configured to direct light signals from outside of the device into the waveguide. A wafer that acts as a spacer 70 is attached and/or bonded to the bottom of the substrate 28. The spacer wafer includes the lens 38 and is transparent to the light signal. In some instances, the spacer wafer is constructed of the same material as the substrate 28. The spacer wafer can have a thickness selected to provide the desired distance between the reflecting side 34 and the lens 38.

The lenses illustrated in the above devices and systems are shown as being flat relative to a plane of the device. However, one or more of the lenses can be tilted relative to the plane of the device. Tilting of a lens 38 can cause the light signal to travel away from the device at a particular angle. Additionally or alternatively, tilting of a lens 38 can permit a device to receive a light signal from a particular angle.

The above devices and systems can be fabricated using integrated circuit fabrication technologies. For instance, the port recess can be fabricated by wet etching. Wet etching a crystalline light-transmitting medium produces an angled side. For instance, wet etching of silicon produces a side at 54.7° relative to the base. Accordingly, the reflecting side is a natural result of wet etching. The lens 38 can be fabricated by masking the location where the lens 38 is to be formed with a gray-scale mask and etching. The gray-scale mask is configured to provide the desired lens 38. When etching with the gray-scale mask in place, the remainder of the bottom of the base can be masked in order to achieve a lens recess as shown in FIG. 2C. Alternately, the remainder of the bottom of the base can be exposed during the etch to provide a lens 38 extending from the bottom of the base as shown in FIG. 2D. After the lens 38 is formed, the port recess can optionally be further trimmed to fine tune the alignment of the lens 38 and the port recess. For instance, additional trimming can enhance the alignment of the lens 38 and the reflecting side 34. Additional trimming can include forming additional masks and performing additional etches.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
 an optical device having a waveguide immobilized on a base,
  a lens defined by the base,
  a reflecting side that reflects a light signal that travels on an optical pathway that extends through the lens and into the waveguide,
   the optical pathway extending into the waveguide such that the light signal is guided through the waveguide, and
   the reflecting side positioned to reflect the light signal as the light signal travels along a portion of the optical pathway between the lens and the waveguide, and
  an optical insulator that confines the light signal within the waveguide, the portion of the optical pathway between the lens and the waveguide extending through the optical insulator such that the optical insulator transmits the light signal; and
 a second device, having a second waveguide immobilized on a second base,
  a second lens defined by the second base, the optical pathway extending through the second lens and into the second waveguide, the second lens having different optical characteristics from the lens.

2. The system of claim 1, wherein the optical insulator is more than 0.3 microns thick.

3. The system of claim 1, wherein the base includes a substrate through which the optical pathway extends and the lens is defined by a surface of the substrate.

4. The system of claim 1, wherein the base includes a substrate, the lens is positioned in a recess extending into the substrate, the lens is defined by a surface of the substrate, and an optical pathway that the light signal travels from the optical insulator to the lens passes through a portion of the substrate.

5. The system of claim 1, wherein the base includes a substrate and the lens is a bump on the substrate, the bump extending outward and away from the waveguide.

6. The system of claim 1, wherein the base includes a substrate that defines the lens and the waveguide guides the light-signal through a light-transmitting medium, the light-transmitting medium and the substrate being the same material.

7. The system of claim 1, wherein the base includes a substrate that defines the lens and the waveguide guides the light-signal through a light-transmitting medium, the light-transmitting medium and the substrate being silicon and the optical insulator being silica.

8. The system of claim 1, wherein optical insulator is between the lens and the waveguide.

9. The system of claim 1, wherein the waveguide guides the light-signal through a light-transmitting medium, a recess extends into the light-transmitting medium, and a side of the recess serves as the reflecting side.

10. The system of claim 1, wherein the base includes a substrate having a flat side, the substrate also defining the lens such that the flat side of the substrate surrounds the lens.

11. The system of claim 1, wherein the lens has a focal length greater than 10 microns.

12. The system of claim 1, wherein the lens has a numerical aperture of at least 0.5.

13. The system of claim 1, further comprising:
 a second reflecting side that reflects the light signal as the light signal travels on a portion of the optical pathway between the second lens and the second waveguide; and
 a second optical insulator that confines the light signal within the second waveguide, a portion of the optical pathway between the second lens and the second waveguide extending through the second optical insulator such that the second optical insulator transmits the light signal.

14. The system of claim 1, wherein the second device is spaced apart from the device such that an atmosphere in which the system is located is between the device and the second device.

15. The system of claim 1, wherein a focal length of the lens is more than 1.2 times a focal length of the second lens.

16. The system of claim 15, wherein a focal length of the second lens is less than 200 microns.

17. The system of claim 1, wherein a numerical aperture of the second lens is at least 1.2 times a numerical aperture of the lens.

18. The system of claim 17, wherein a numerical aperture of the second lens is at least 0.7.

* * * * *